(12) United States Patent
Straub, Jr. et al.

(10) Patent No.: US 8,166,829 B2
(45) Date of Patent: May 1, 2012

(54) METHOD AND SYSTEM OF AN ULTRASONIC FLOW METER TRANSDUCER ASSEMBLY

(75) Inventors: Henry C. Straub, Jr., Sugar Land, TX (US); Randeep Grewal, Houston, TX (US)

(73) Assignee: Daniel Measurement and Control, Inc., Houston, TX (US)

( * ) Notice: Subject to any disclaimer, the term of this patent is extended or adjusted under 35 U.S.C. 154(b) by 151 days.

(21) Appl. No.: 12/825,769

(22) Filed: Jun. 29, 2010

(65) Prior Publication Data

US 2011/0314932 A1 Dec. 29, 2011

(51) Int. Cl.
G01F 1/20 (2006.01)
(52) U.S. Cl. .................................... 73/861.18
(58) Field of Classification Search ............... 73/861.18
See application file for complete search history.

(56) References Cited

U.S. PATENT DOCUMENTS

| | | | |
|---|---|---|---|
| 4,297,607 A | 10/1981 | Lynnworth et al. | |
| 4,523,122 A | 6/1985 | Tone et al. | |
| 7,152,490 B1 * | 12/2006 | Freund et al. | 73/861.27 |
| 7,307,373 B2 * | 12/2007 | Straub et al. | 310/334 |
| 7,735,380 B2 * | 6/2010 | Groeschel et al. | 73/861.27 |
| 7,911,306 B2 * | 3/2011 | Allen | 336/90 |
| 2004/0124746 A1 | 7/2004 | Suzuki et al. | |
| 2009/0007694 A1 | 1/2009 | Breeuwer | |
| 2009/0174514 A1 | 7/2009 | Allen | |

OTHER PUBLICATIONS

Allen, et al. "Ultrasonic Flow Meter and Transducer Assembly with Isolated Transformer Capsule", U.S. Appl. No. 12/683,036, filed Jan. 6, 2010.

International Search Report and Written Opinion issued Feb. 9, 2012 in International Patent Application Serial No. PCT/US2011/029238.

\* cited by examiner

*Primary Examiner* — Jewel V Thompson
(74) *Attorney, Agent, or Firm* — Mark E. Scott; Conley Rose, P.C.

(57) ABSTRACT

Ultrasonic flow meter transducer assembly. At least one some of the illustrative embodiment are systems including: a spool piece that defines an exterior surface, a central passage, and a transducer port extending from the exterior surface to the central passage; and a transducer assembly coupled to the transducer port. The transducer assembly includes: a transition element coupled to the spool piece, the transition element having a first end disposed within the transducer port, and a second end residing outside the exterior surface; a piezoelectric module with a piezoelectric element, the piezoelectric module directly coupled to the first end of the transition element and the piezoelectric module disposed within the exterior surface; a transformer module with a transformer disposed therein, the transformer module directly coupled to the second end of the transition element and the transformer module disposed outside the exterior surface; and an electrical conductor disposed within a passage through the transition element, the electrical conductor couples the transformer to the piezoelectric element.

20 Claims, 11 Drawing Sheets

METHOD AND SYSTEM OF AN ULTRASONIC FLOW METER TRANSDUCER ASSEMBLY

BACKGROUND

After hydrocarbons have been removed from the ground, the fluid stream (e.g., crude oil, natural gas) is transported from place-to-place via pipelines. It is desirable to know with accuracy the amount of fluid flowing a pipeline, and particular accuracy is demanded when the fluid is changing hands, or "custody transfer." Ultrasonic flow meters may be used to measure the amount of fluid flowing in a pipeline, and ultrasonic flow meters have sufficient accuracy to be used in custody transfer. The value of gas "changing hands" at the point of custody transfer in a high volume natural gas pipeline may amount to a million dollars or more in a single day. For this reason, manufacturers attempt to make ultrasonic meters that are not only very accurate, but also reliable in the sense that the mean time between failures is large.

Thus, any advance which increases the reliability of ultrasonic meters, and/or which decreases the time to troubleshoot and repair time after an ultrasonic meter has failed, would provide a competitive advantage in the marketplace.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, ultrasonic meter manufacturing companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Figure 1:
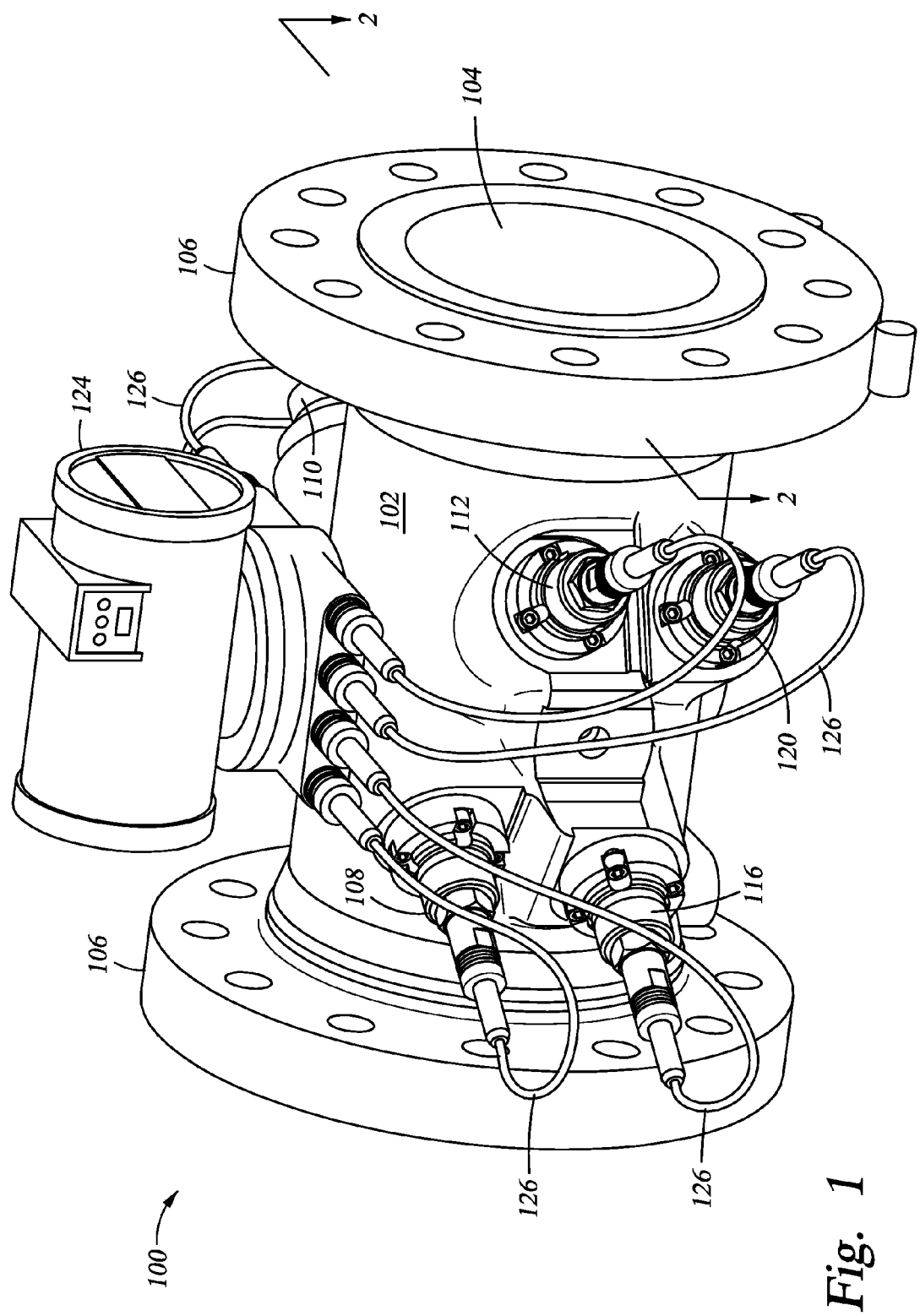
FIG. 1 shows an ultrasonic meter in accordance with at least some embodiments.

FIG. 1 shows an ultrasonic meter 100 in accordance with at least some embodiments. In particular, the ultrasonic meter comprises a meter body or spool piece 102 that defines a central passage 104. The spool piece 102 is designed and constructed to be coupled to a pipeline carrying fluids such that the fluids flowing in the pipeline likewise travel through the central passage 104. While the fluids travel through the central passage 104, the ultrasonic meter 100 measures the flow rate (hence, the fluid may be referred to as the measured fluid). The illustrative spool piece 102 in FIG. 1 is configured to couple to the pipeline (not shown) by way of flanges 106; however, any suitable system to couple the spool piece 102 to the pipeline may be equivalently used (e.g., weld connections).

In order to measure fluid flow within the meter, the ultrasonic meter 100 uses a plurality of transducer assemblies. In the view of FIG. 1 five such transducers assembles 108, 110, 112, 116 and 120 are in full or partial view. The transducer assemblies are paired (e.g., transducer assemblies 108 and 110), as will be discussed more below. Moreover, each transducer assembly electrically couples to control electronics, illustratively housed in enclosure 124. More particular, each transducers assembly electrical couples to the control electronics in the enclosure 124 by way of a respective cable 126.

Figure 2:
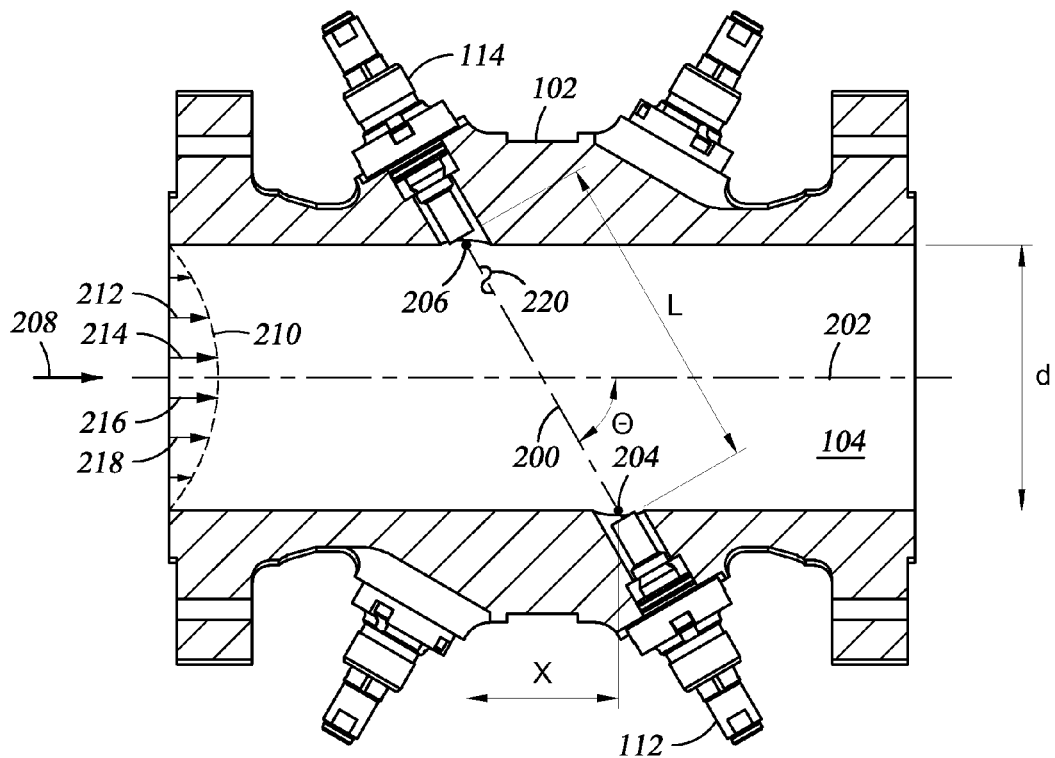
FIG. 2 shows a cross-sectional overhead view of an ultrasonic flow meter in accordance with at least some embodiments, with FIG. 2 taken substantially along 2-2 of FIG. 1.

FIG. 2 shows a cross-sectional an overhead view of the ultrasonic flow meter 100 taken substantially along line 2-2 of FIG. 1. Spool piece 102 has a predetermined size and defines the central passage 104 through which the measured fluid flows. An illustrative pair of transducers assemblies 112 and 114 is located along the length of spool piece 102. Transducers 112 and 114 are acoustic transceivers, and more particularly ultrasonic transceivers, meaning that they both generate and receive acoustic signals having frequencies of above about 20 kilohertz. The acoustic signals may be generated and received by a piezoelectric element in each transducer. To generate an ultrasonic signal, the piezoelectric element is stimulated electrically by way of a sinusoidal signal, and it responds by vibrating. The vibration of the piezoelectric element generates the acoustic signal that travels through the measured fluid to the corresponding transducer assembly of the pair. Similarly, upon being struck by an acoustic signal, the receiving piezoelectric element vibrates and generates a sinusoidal electrical signal that is detected, digitized, and analyzed by electronics associated with the meter.

A path 200, sometimes referred to as a "chord," exists between illustrative transducer assemblies 112 and 114 at an angle θ to a centerline 202. The length of chord 200 is the distance between the face of transducer assembly 112 and the face of transducer assembly 114. Points 204 and 206 define the locations where acoustic signals generated by transducer assemblies 112 and 114 enter and leave fluid flowing through the spool piece 102 (i.e., the entrance to the spool piece bore). The position of transducer assemblies 112 and 114 may be defined by the angle θ, by a first length L measured between the faces of the transducer assemblies 112 and 114, a second length X corresponding to the axial distance between points 204 and 206, and a third length "d" corresponding to the pipe inside diameter. In most cases distances d, X and L are precisely determined during meter fabrication. A measured fluid, such as natural gas, flows in a direction 208 with a velocity profile 210. Velocity vectors 212, 214, 216 and 218 illustrate that the gas velocity through spool piece 102 increases toward the centerline 202 of the spool piece 102.

Initially, downstream transducer assembly 112 generates an ultrasonic signal that is incident upon, and thus detected by, upstream transducer assembly 114. Some time later, the upstream transducer assembly 114 generates a return ultrasonic signal that is subsequently incident upon, and detected by, the downstream transducer assembly 112. Thus, the transducer assemblies play "pitch and catch" with ultrasonic signals 220 along chordal path 200. During operation, this sequence may occur thousands of times per minute.

The transit time of an ultrasonic signal 220 between illustrative transducer assemblies 112 and 114 depends in part upon whether the ultrasonic signal 220 is traveling upstream or downstream with respect to the fluid flow. The transit time for an ultrasonic signal traveling downstream (i.e., in the same direction as the fluid flow) is less than its transit time when traveling upstream (i.e., against the fluid flow). The upstream and downstream transit times can be used to calculate the average velocity along the signal path, and the speed of sound in the measured fluid. Given the cross-sectional measurements of the meter carrying the fluid, the average velocity over the area of the central passage may be used to find the volume of fluid flowing through the spool piece 102.

Figure 3:
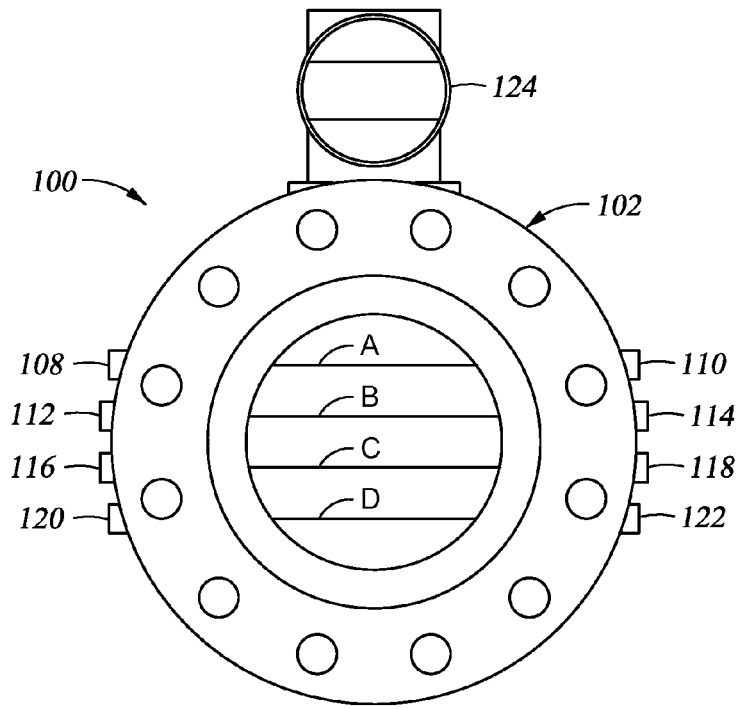
FIG. 3 shows an end elevation view in accordance with at least some embodiments.

Ultrasonic flow meters can have one or more chords. FIG. 3 illustrates an end elevation view of ultrasonic flow meter 100. In particular, illustrative ultrasonic flow meter 100 comprises four chordal paths A, B, C and D at varying levels within the spool piece 102. Each chordal path A-D corresponds to a transducer pair behaving alternately as a transmitter and receiver. Transducer assemblies 108 and 110 (only partially visible) make up chordal path A. Transducer assemblies 112 and 114 (only partially visible) make up chordal path B. Transducer assemblies 116 and 118 (only partially visible) make up chordal path C. Finally, transducer assemblies 120 and 122 (only partially visible) make up chordal path D.

Figure 4:
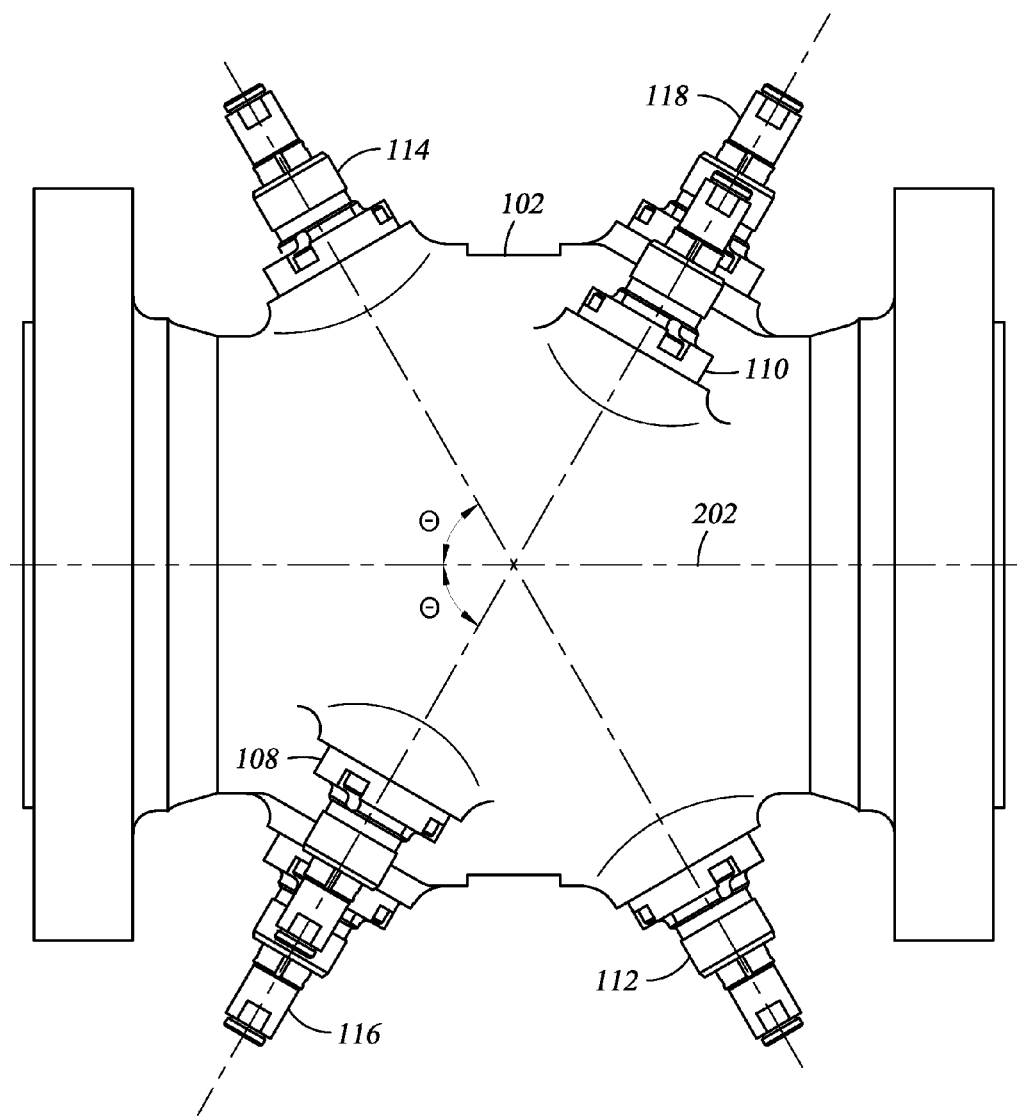
FIG. 4 shows a partial overhead view in accordance with at least some embodiments.

A further aspect of the arrangement of the four pairs of transducers is shown with respect to FIG. 4, which shows an overhead view. Each transducer pair corresponds to a single chordal path of FIG. 3; however, the transducer assemblies are mounted at a non-perpendicular angle to the center line 202. For example, a first pair of transducer assemblies 108 and 110 is mounted at a non-perpendicular angle θ to centerline 202 of spool piece 102. Another pair of transducer assemblies 112 and 114 is mounted so that the chordal path loosely forms the shape of an "X" with respect to the chordal path of transducer assemblies 108 and 110. Similarly, transducer assemblies 116 and 118 are placed parallel to transducer assemblies 108 and 110, but at a different "level" or elevation. Not explicitly shown in FIG. 4 is the fourth pair of transducer assemblies (i.e., transducer assemblies 120 and 122). Considering FIGS. 2, 3 and 4, the transducers pairs are arranged such that the upper two pairs of transducers corresponding to chords A and B form an the shape of an "X", and the lower two pairs of transducers corresponding to chords C and D also form the shape of an "X". The flow velocity of the fluid may be determined at each chord A-D to obtain chordal flow velocities, and the chordal flow velocities are combined to determine an average flow velocity over the entire pipe. From the average flow velocity, the amount of fluid flowing in the spool piece, and thus the pipeline, may be determined.

Figure 5:
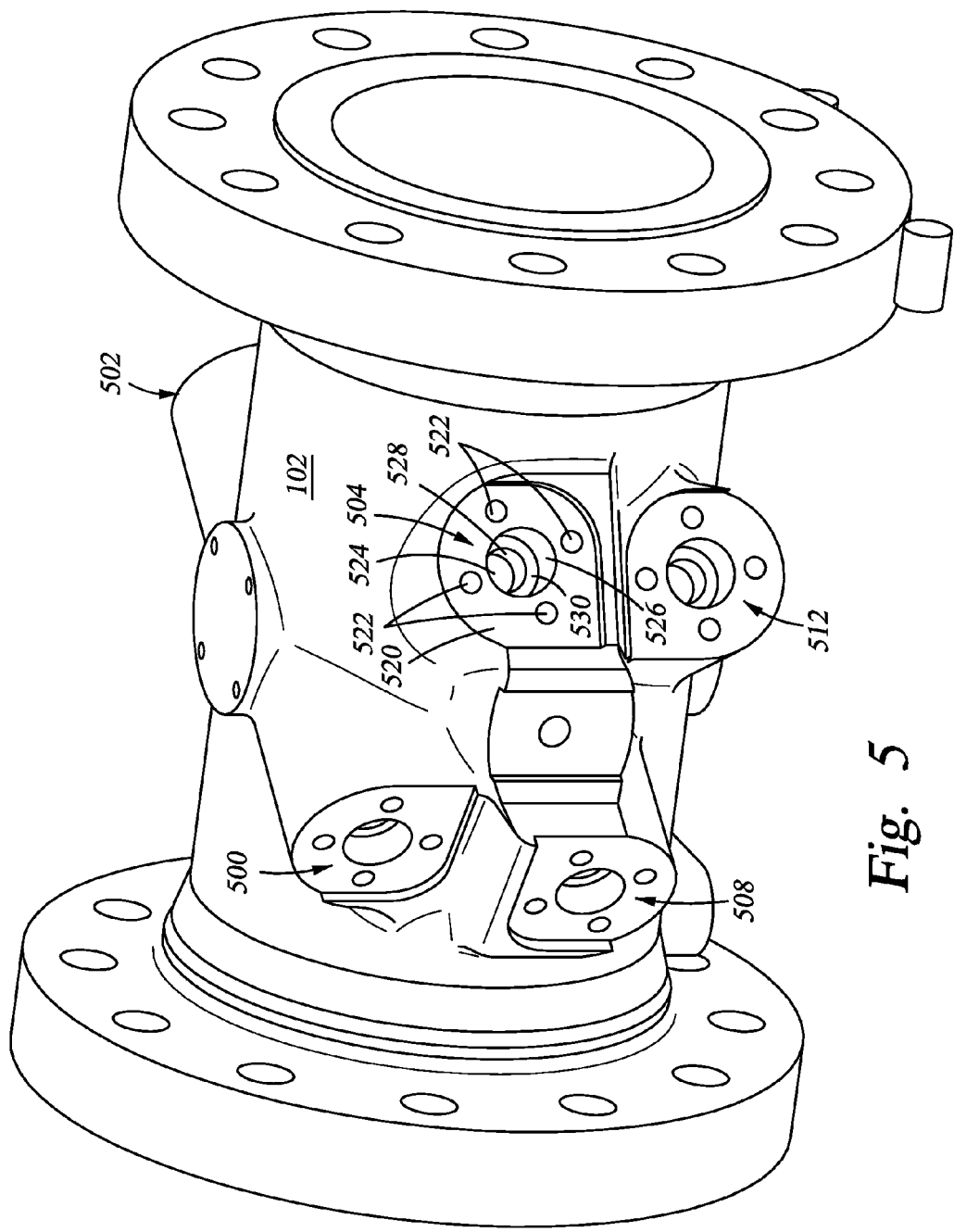
FIG. 5 shows a perspective view of a spool piece in accordance with at least some embodiments.

FIG. 5 shows a perspective view of the spool piece 102 with the transducer assemblies removed. In particular, the spool piece 102 defines a plurality of transducer ports. In the view of FIG. 5, only five such transducer ports 500, 502, 504, 508 and 512 are in full or partial view. Similarly to the transducer assemblies, the transducer ports are paired. For example, transducer port 500 is paired with transducer port 502, and so on. Referring to transducer port 504 as illustrative of all the transducer ports, transducer port 504 comprises flange surface 520. A plane defined by the illustrative flange surface 520 is normal to the chord defined by the transducer pair that uses transducer port 504. As shown, the flange surface 520 comprises a plurality of threaded apertures 522, to which a transducer assembly mechanically couples.

Still referring to transducer port 504 as illustrative of all the transducer ports, transducer port 504 further comprises aperture 524 that fluidly couples to the central passage 104 of the spool piece 102. As illustrated, the aperture comprises a larger diameter portion 526 and a smaller diameter portion 528, thus forming a shoulder 530. In other embodiments, the aperture 524 may have a single internal diameter, or three or more different internal diameters between the flange surface 520 and the central passage 104. For purpose of this specification and claims, and with respect to a particular transducer port, an object (or portion of an object) that physically resides within an aperture between the plane formed by the flange surface and the central passage shall be referred to as residing within the transducer port. Likewise, and with respect to a particular transducer port, an object (or portion of an object) that physically resides external to a volume within the aperture between the plane formed by the flange surface and the central passage (and also residing outside the central passage) shall be referred to as residing outside the transducer port or outside the exterior surface of the spool piece 102. The specification now turns to shortcomings of related-art transducer assemblies.

Components of an ultrasonic flow meter that are particularly vulnerable to failure are the transducer assemblies, and more particularly matching transformers within the transducer assemblies. Matching transformers perform electrical impedance matching between control electronics and the piezoelectric elements that produce and detect acoustic energy. Because the piezoelectric elements are susceptible to capacitive loading caused by the length of cabling between the impedance matching transformer and the piezoelectric element, the impedance matching transformers of the related-art are placed adjacent to the piezoelectric elements and within a transducer port. Although the impedance matching transformers may be protected in some form (e.g., by an encapsulant), having the impedance matching transformers within the transducer port exposes the impedance matching transformers to many undesirable conditions. For example, being within the transducer port the impedance matching transformers may experience very high and/or very low temperatures (beyond ambient temperature swings). The temperature variations cause thermal expansion and contraction, which creates mechanical stresses on the transformer (both internally, as well as stresses caused by expansion and contraction of the surrounding encapsulant). Moreover, the pressure within a meter may reach several hundred pounds per square inch (PSI) or more, and/or the pressure within the meter may experience large pressure swings (e.g., from use to non-use conditions). Here again, the changes in pressure cause expansion and contraction that mechanically stresses the impedance matching transformers as well as the surrounding encapsulant. Moreover, the measured fluid itself may be corrosive, both to the materials that make up the transformer, as well as the encapsulant itself. What is more, placing impedance matching transformers adjacent to the piezoelectric elements dictates a small physical size of the impedance matching transformers. For example, if the impedance matching transformer is within a transducer port, the internal diameter of the aperture of the transducer port dictates the size of the transformer.

The inventors of the present specification have determined that the impedance matching transformer can be moved a relatively short distance from the piezoelectric element without severely degrading performance of the piezoelectric element, yet making significant gains in reliability of transducer assemblies, improving the ability to troubleshoot failed transducer assemblies, and decreasing maintenance time to repair failed transducer assemblies. In particular, the inventors of the present specification have found that moving the impedance matching transformer outside a pressure barrier created by the transducer assembly, and outside the transducer port, leads to: increased mean time between failures for the transducer assemblies caused by the impedance matching transformers; decreases the amount of time needed to troubleshoot failures of the transducer assemblies caused by impedance matching transformer failures; and decreases the amount of time needed to repair transducer failures caused by failures of the impedance matching transformers.

More particular still, ultrasonic flow meters using transducer assemblies that produce acoustic energy at frequencies of about 125 kilo-Hertz (i.e., ultrasonic flow meters where the measured fluid is a gas), the piezoelectric elements have impedances of about 1 to 2 kilo-Ohms, and the drive/receive circuits have an impedance of about 30 Ohms. By comparison, ultrasonic flow meters that produce frequencies in the 400 kilo-Hertz to 1 Mega-Hertz range (i.e., ultrasonic flow meters where the measured fluid is liquid) in many cases do not need matching transformers between the control electronics and the piezoelectric elements. The inventors have found that the impedance matching transformers can be placed within two feet or less of the piezoelectric elements without severely degrading performance. In a particular embodiment, the impedance matching transformers are placed within six inches of the piezoelectric element. Physically placing the transformer away from the piezoelectric element not only removes the transformer from possible contact with the pressure, temperature and potentially corrosive gases within the process chamber, but also places transformer outside the transducer port. The specification now turns to an illustrative transducer assembly.

Figure 6:
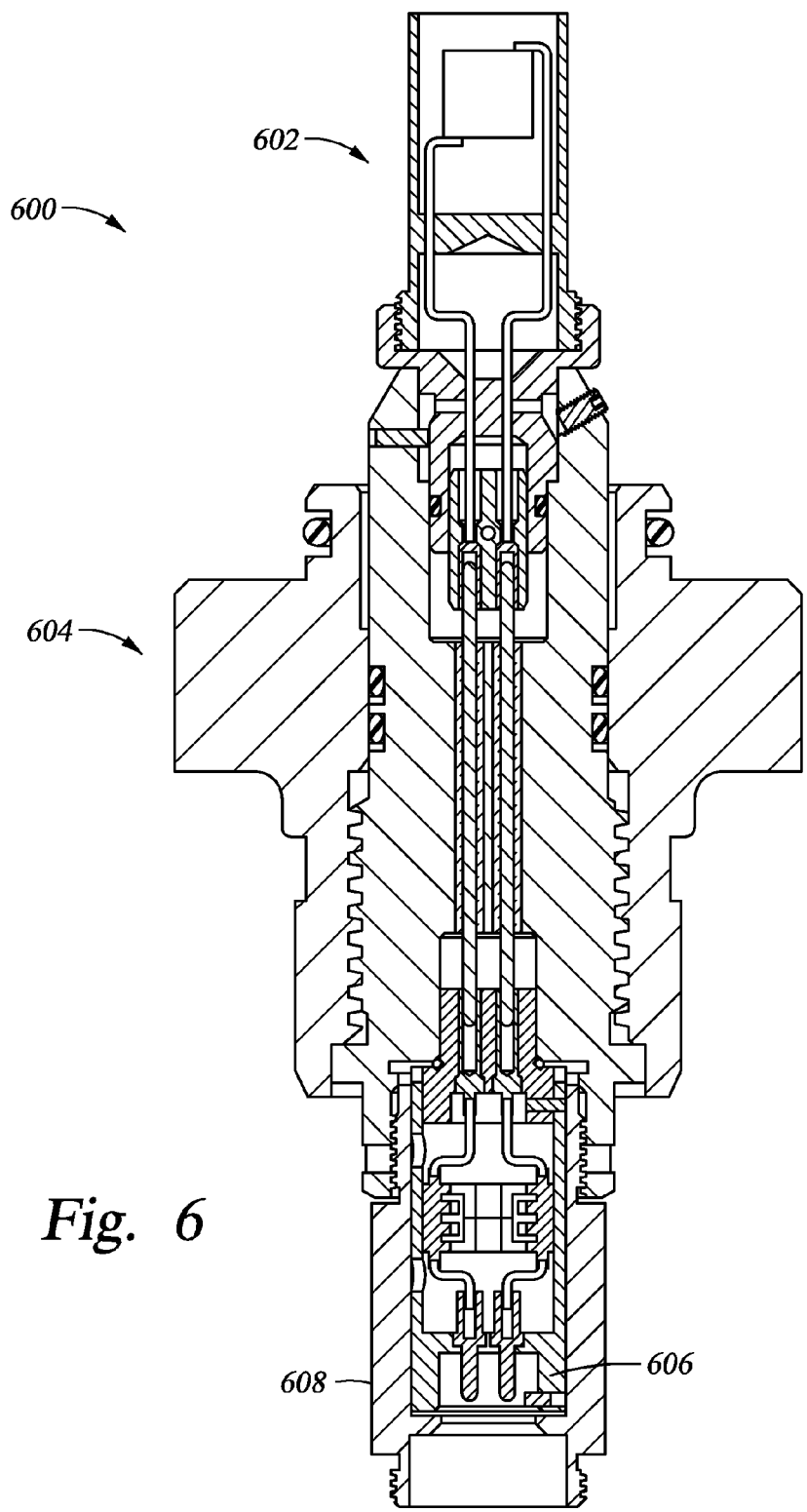
FIG. 6 shows a cross-sectional elevation view of a transducer assembly in accordance with at least some embodiments.

FIG. 6 shows a cross-sectional view of transducer assembly 600 in accordance with at least some embodiments. The transducer assembly 600 is illustrative any of the transducer assemblies 108, 110, 112, 114, 116, 118, 120 and 122. In particular, the illustrative transducer assembly 600 may be considered to comprise four major components (from top to bottom in FIG. 6): a piezoelectric capsule or module 602 (discussed with respect to FIG. 7); a coupling member 604 (discussed with respect to FIG. 8); a transformer capsule or module 606 (discussed with respect to FIG. 9); and a transformer module retaining member 608 (also discussed with respect to FIG. 9). Each will be discussed in turn.

Figure 7:
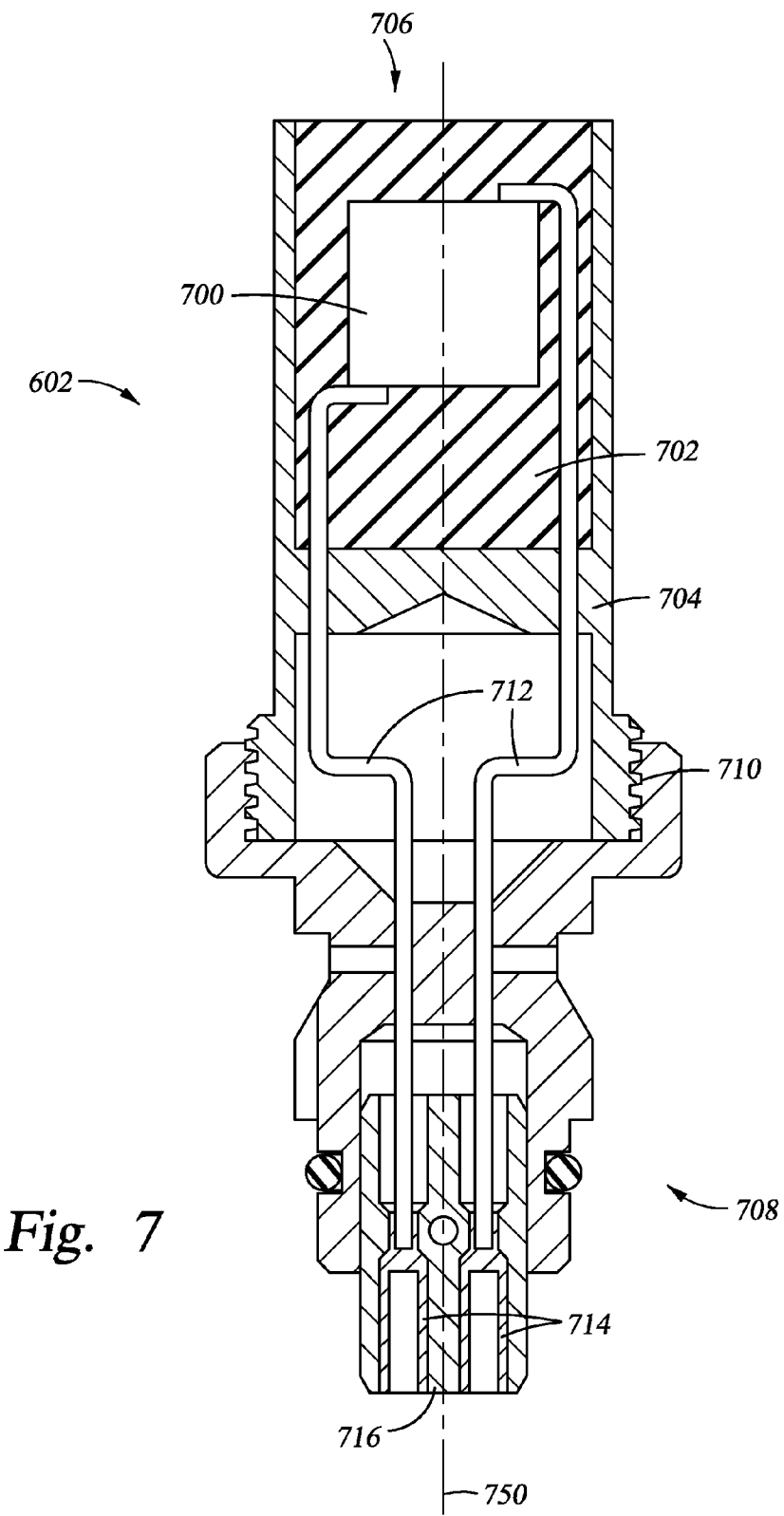
FIG. 7 shows a cross-sectional elevation view of a piezoelectric module in accordance with at least some embodiments.

FIG. 7 shows a cross-sectional view of the piezoelectric module 602 in accordance with various embodiments. In particular, piezoelectric module 602 comprises a piezoelectric element 700 disposed within an acoustic impedance matching material 702. The impedance matching material 702 has an acoustic impedance between that of the piezoelectric element 700 and the measured fluid, and in a particular embodiment the impedance matching material 702 is epoxy. In the illustrative embodiment the piezoelectric element 700 is disposed within a cylindrical outer housing 704 with an open end 706. In some embodiments, the cylindrical outer housing 704 is metallic, but other shapes and materials may be equivalently used. The piezoelectric module 602 further comprises a plug portion 708 configured to telescope within a counterbore of the coupling member 604. In the illustrated embodiment, the plug portion 708 and cylindrical outer housing 704 are separate elements coupled together by threads 710. Electrical conductors 712 couple on a one end to the piezoelectric element 700, and couple on a second end to electrical pins 714 in the plug portion 708. As illustrated, two electrical pins 714 are used, and the electrical pins 714 are illustratively female electrical pins; however, male pins may be equivalently used, as well different types of electrical connections, such as coaxial-type connections. The illustrative electrical pins 714 are electrically isolated from the plug portion 616 by way of an insulating member 716, which may also act to hold the pins 714 in place. Finally, the piezoelectric module 602 has or defines a central axis 750.

Figure 8:
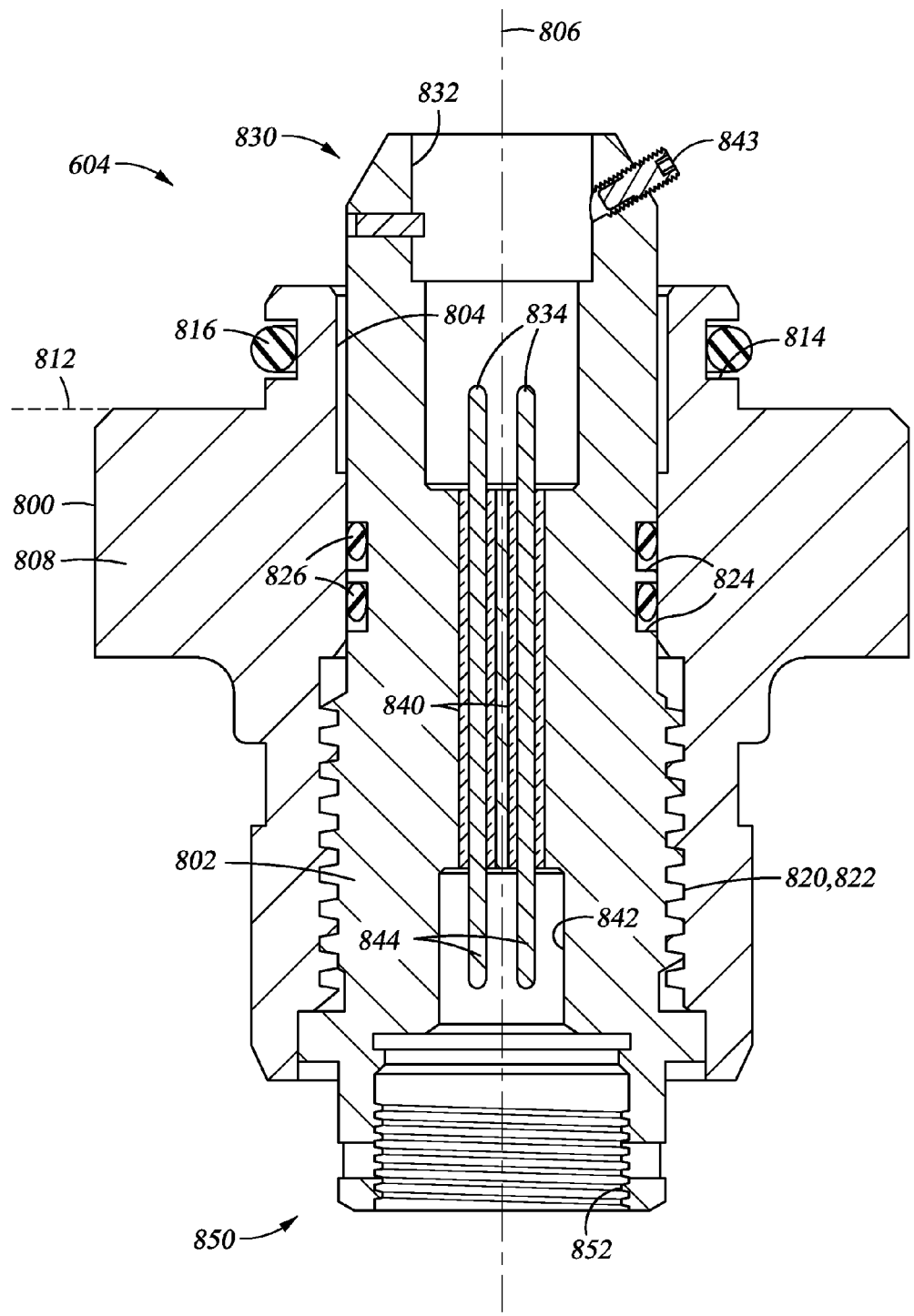
FIG. 8 shows a cross-sectional elevation view of a coupling member in accordance with at least some embodiments.

Referring to FIG. 8, the coupling member 604 as illustrated comprises a mounting member 800 as well as a transition member 802. The mounting member defines a circular bore 804 along the central axis 806. The transition member 802 telescopes within the circular bore 804, as discussed more below. The mounting member 800 further comprise a flange portion 808 disposed on a medial portion of the mounting member 800. The flange portion 808 is configured to couple the transducer assembly to the exterior surface of the spool piece 102, and in particular to couple the transducer assembly to a respective flange surface 520 (FIG. 5). The flange portion 808 defines a plane normal to the central axis 806 of the coupling member. For example, flange surface 810 lies within and/or defines a plane (in the view of FIG. 8, the plane would merely be a line, and thus is illustrated as dashed line 812). Mounting member 800 further comprises an annular groove 814 within which an elastomeric sealing member 816 (e.g., an O-ring) may be placed. When the coupling member 604 is installed in a transducer port 504 (FIG. 5), the elastomeric sealing member 816 seals within the annular groove 814 and against the internal diameter of the aperture 524, thus forming a portion of a pressure barrier between the central passage 104 (FIG. 1) of the ultrasonic flow meter and ambient atmosphere. In other embodiments, the mounting member 800 may couple to the spool piece by any suitable means, such as by a threaded connection.

Transition member 802 is disposed within the circular bore 804 of the mounting member 800. In particular, the transition member 804 has threads 820 on an outer diameter that threadingly couple to threads 822 on an inner diameter of the circular bore 804. Other mechanisms to mechanically couple the transition member 802 to the mounting member 800 may be equivalently used. The outer diameter of the transition member also comprises one or more annular grooves with corresponding elastomeric sealing members. In the illustration of FIG. 8, two such annular grooves 824 are shown, along with two elastomeric sealing members 826; however, one or more of each may be used depending on the expected maximum pressure within the ultrasonic meter. The elastomeric sealing members 826 seal within the respective annular grooves 824 and the internal diameter of the circular bore 804, thus forming at least a portion of a pressure barrier between the central passage 104 (FIG. 1) and ambient atmosphere.

Still referring to FIG. 8, the transition member 802 further comprises a first end 830 (proximate the piezoelectric module) that has a counterbore 832. It is within the counterbore 832 that the plug portion 708 (FIG. 7) of the piezoelectric module 602 telescopes, and is at least partially held in place by the set screw 843. As illustrated, two electrical pins 834 reside within the counterbore 832, and the electrical pins are arranged such that when the plug portion 708 telescopes within the counterbore 832 the electrical pins 834 electrically couple to the electrical pins 714. While in illustrative FIG. 8 the electrical pins 834 are male pins, in other embodiments female pins may be equivalently used. The electrical pins 834 are electrically isolated from the balance of the transition member 802, which in some embodiments is metallic.

The illustrative transition member 802 further comprises at least one, and as illustrated two, passages 840. The passages 840 extend from the first counterbore 832 to a second counterbore 842. At least one electrical conductor (not specifically shown) resides within each passage 840, thus electrically coupling the pins 834 in the first counterbore 832 to pins 844 in the second counterbore 842. In accordance with the various embodiments, the passages 840 are sealed such that measured fluid within meter cannot escape to ambient atmosphere through passages 840. In accordance with at least some embodiments, the seals formed within the passages 840 are a glass-to-metal seal (the metal being the metallic material of the transition member 802); however, any suitable sealing mechanism may be equivalently used.

Still referring to FIG. 8, and as mentioned briefly in reference to the passages 840, the illustrative transition member 802 comprises a second end 850 (proximate to the transformer module 606) within which the counterbore 842 resides. It is within the counterbore 842 in which a portion of the transformer module 606 telescopes (discussed more below). Moreover, it is within the counterbore 842 that the transformer retaining module telescopes, and in some embodiments counterbore 842 comprises threads 852 on an internal diameter of the counterbore 842 such that the transformer retaining module threadingly couples to the transition member 802. As illustrated, two electrical pins 844 reside within the counterbore 842, and the electrical pins are arranged such that when the transformer module 606 is telescoped within the counterbore 842, the electrical pins 844 electrically couple to the electrical pins of the transformer module 606. While in illustrative FIG. 8 the electrical pins 844 are male pins, in other embodiments female pins may be equivalently used. The electrical pins 844 are electrically isolated from the balance of the metallic transition member 802. The second end 850 of the transition member 802 resides on one side of the plane 812 defined by the flange portion 808, while the first end 830 of the transition member 802 resides on another side of the plane 812.

Figure 9:
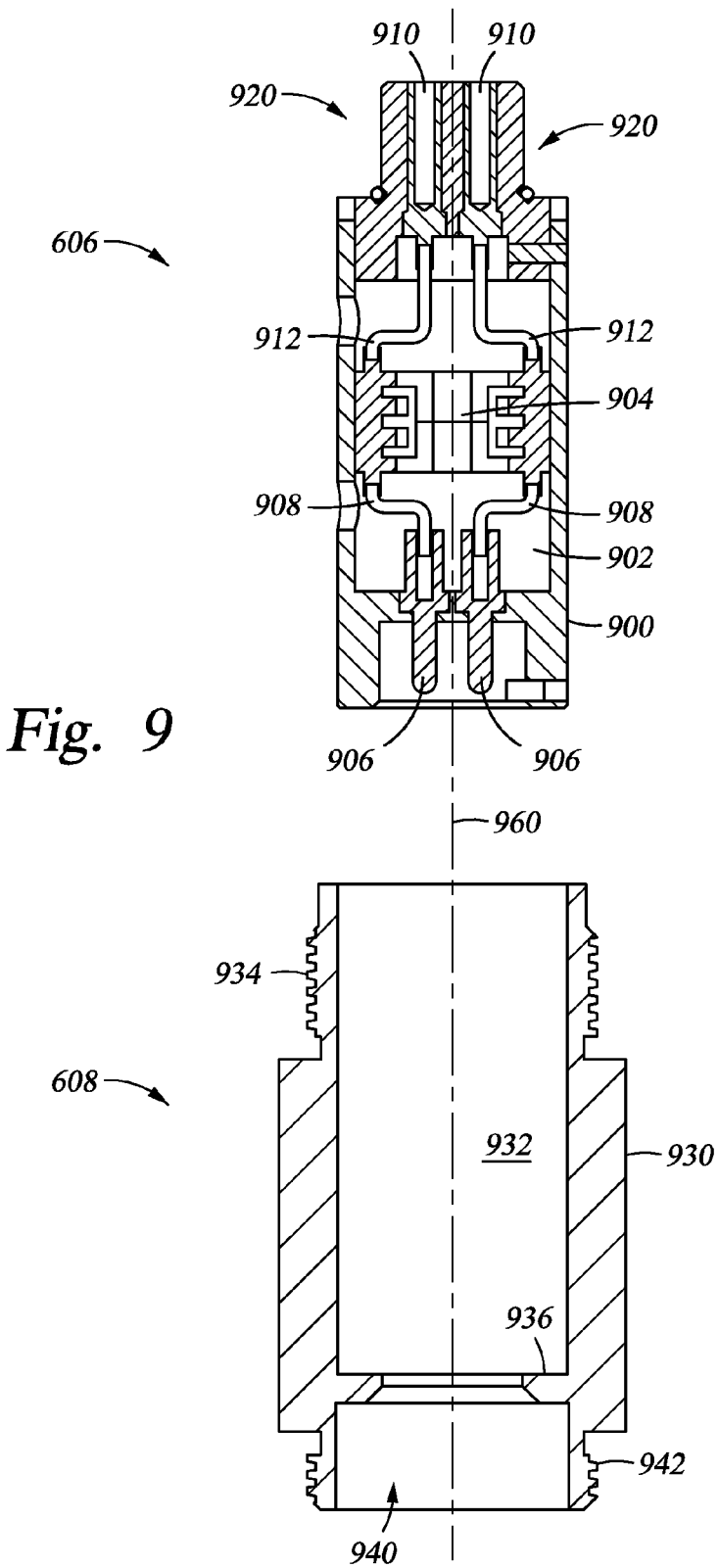
FIG. 9 shows an exploded cross-sectional elevation view of a transducer retaining member and transducer module in accordance with at least some embodiments.

FIG. 9 shows a cross-sectional exploded view of the transformer module 606 and transformer module retaining member 608. In particular, the transformer module 606 comprises a circular outer housing 900 that defines an internal volume 902. In some embodiments, the circular outer housing 900 is plastic; however, the circular outer housing 900 may be equivalently made from other materials (e.g., metallic). Within the internal volume 902 resides impedance matching transformer 904. Impedance matching transformer 904 comprises a primary winding electrically coupled to pins 906 by way conductors 908, as well as a secondary winding electrically coupled to pins 910 by way of conductors 912. Impedance matching transformer 904 provides impedance matching between control electronics and the piezoelectric element 700 (FIG. 7). In some embodiments, the impedance matching transformer 904 is suspended within the internal volume 902 by a non-conductive polymeric material (e.g., epoxy). The transformer assembly 606 further comprises a plug portion 920 which telescopes within the counterbore 842 (FIG. 8) of the transition member 802. The plug portion 920 of the transformer module 606 holds the electrical pins 910. While the illustrative embodiments of FIG. 9 show the electrical pins 910 as female pins, male pins may be equivalently used.

Still referring to FIG. 9, in accordance with the illustrated embodiments the transducer assembly 600 further comprises a transformer module retaining member 608 that is designed and constructed to hold the transformer module 606 in place. As illustrated, the transformer module retaining member 608 comprises a circular outer housing 930 that defines an internal volume 932. On one end the circular outer housing 930 comprises threads 934, which threadingly engage with threads 852 (FIG. 8) of the transition member 802. Other mechanisms to mechanically couple the transformer module retaining member 608 to the transition member 802 may be equivalently used. The transformer module retaining member 608 telescopes over the transformer module 606 such that the transformer module 606 resides within the internal volume 932 of the circular outer housing 930. A shoulder member 936 biases the transformer module 606 toward the transition member 802.

The transformer module retaining member 608 in accordance with at least some embodiments further comprises an aperture 940 on a distal end thereof to expose the electrical pins 906 for connection to cabling. In some embodiments, the distal end of the circular outer housing 930 comprises threads 942 to enable a connector of a cable to mechanically couple to the transformer module retaining member 608 while electrically coupling to electrical pins 906 of the transformer module 606. Each of the transformer module retaining member 608 and transformer module 606 have or define a central axis 960, such that when the transformer module retaining member 608 is telescoped over the transformer module 606, the retaining member 608 and module 606 are coaxial.

As shown by the illustrative arrangement of the components of FIG. 9, the transformer module retaining member 608 may be physically decoupled, and the transformer module 606 may be physically and electrically decoupled from the balance of the components of the transducer assembly 600 without disturbing the pressure barrier. In particular, removal of the transformer module retaining member 608 and transformer module 606 does not disturb the seal created by elastomeric sealing member 816 (FIG. 8), or the seals created by elastomeric sealing members 826. Thus, the transformer module 606 can be removed and replaced without escape of the measured fluid to atmosphere, and thus without the need to de-pressurize the central passage 104 of the ultrasonic fluid meter.

Each of the components of the illustrative transducer assembly 600 has or defines a central axis. In particular, the piezoelectric module 602 has or defines central axis 750 (FIG. 7); the mounting member 800 and transition member 802 of the coupling member 604 have or define central axis 806 (FIG. 8); and the transformer module retaining member 608 and transformer module 606 have or define central axis 960

Figure 10:
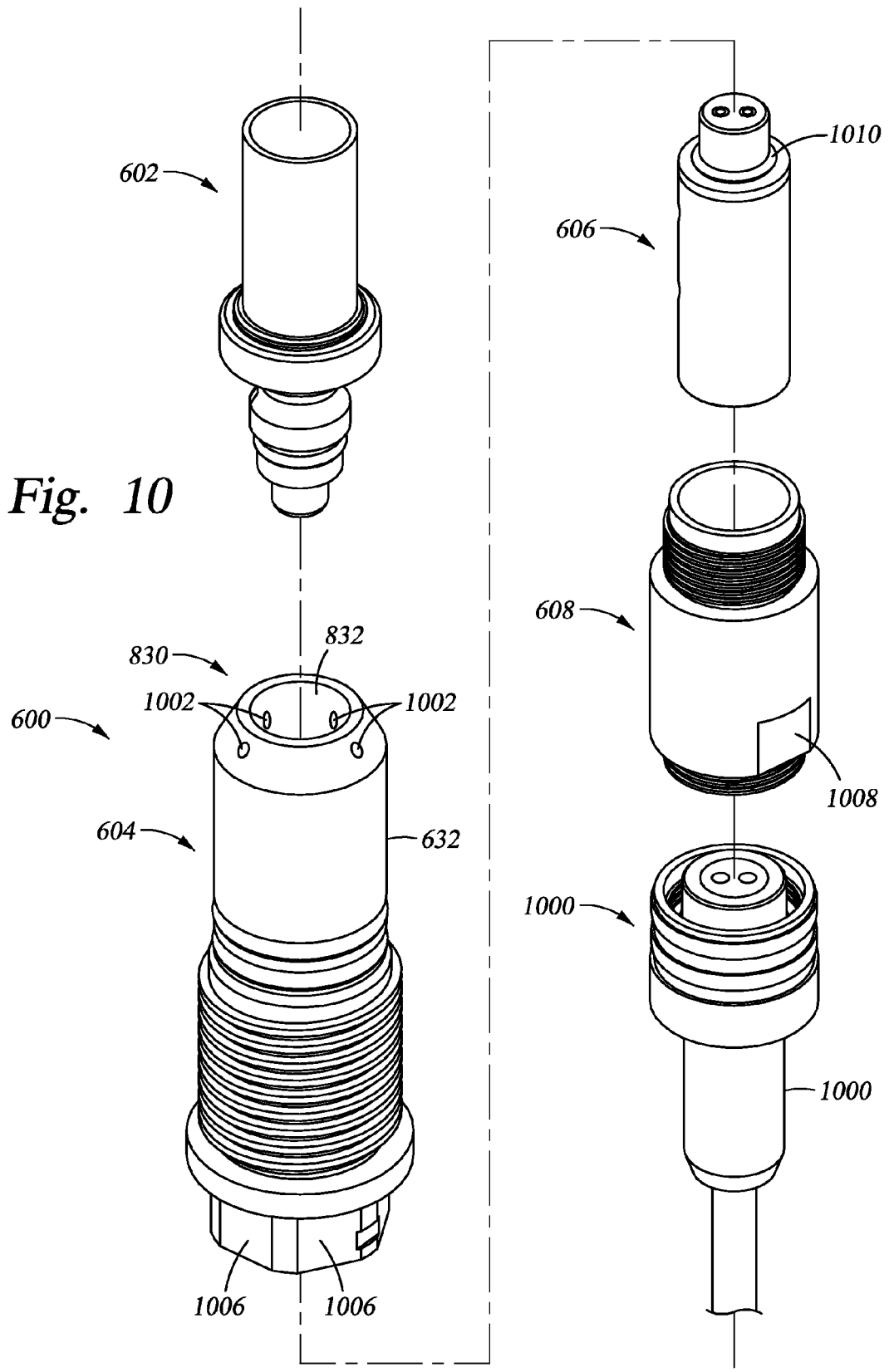
FIG. 10 shows an exploded view of a transducer assembly, along with a cabling, in accordance with at least some embodiments.

(FIG. 9). FIG. 10 shows an exploded perspective view of the transducer assembly 600, along with the cabling 1000, which shows the central axis of each component, and which further conveys how the various components are assembled. In particular, FIG. 10 is an exploded perspective view that shows the piezoelectric module 602, a portion of the coupling member 604 (particularly the transition member 802), the transformer module 606 and the transformer retaining module 608. FIG. 10 further shows that, in accordance with at least some embodiments, the central axis of each component are coaxial when assembled.

FIG. 10 shows further features of various components. For example, the first end 830 of the transition member 802 comprises a plurality of apertures 1002. The apertures may be internally threaded such that set screws may be screwed therein, with the set screws then contacting the piezoelectric module 602, holding the plug portion 708 of piezoelectric module 602 in the counterbore 832. Further still, transition member 802 may comprise two or more flat regions 1006 oppositely disposed on the second end 850 such that a tool may be used to couple the transition member 802 to the mounting member 800 (not specifically shown in FIG. 10). Likewise, the distal portion of transformer module retaining member 608 may also have two or more flat regions 1008 (only one such region visible in FIG. 10), to enable the use of a tool to assist in coupling the transformer module retaining member 608 to the transition member 802. Finally, the transformer module 606 has an elastomeric sealing member 1010 disposed around the plug portion 920 which forms a seal against the plug portion 920 and the internal diameter of the counterbore 842; however, the seal formed by the elastomeric sealing member 1010 may be useful in sealing the electrical connections against moisture intrusion from ambient atmosphere, as other measured fluid is held within meter by other sealing mechanisms as discussed.

Figure 11:
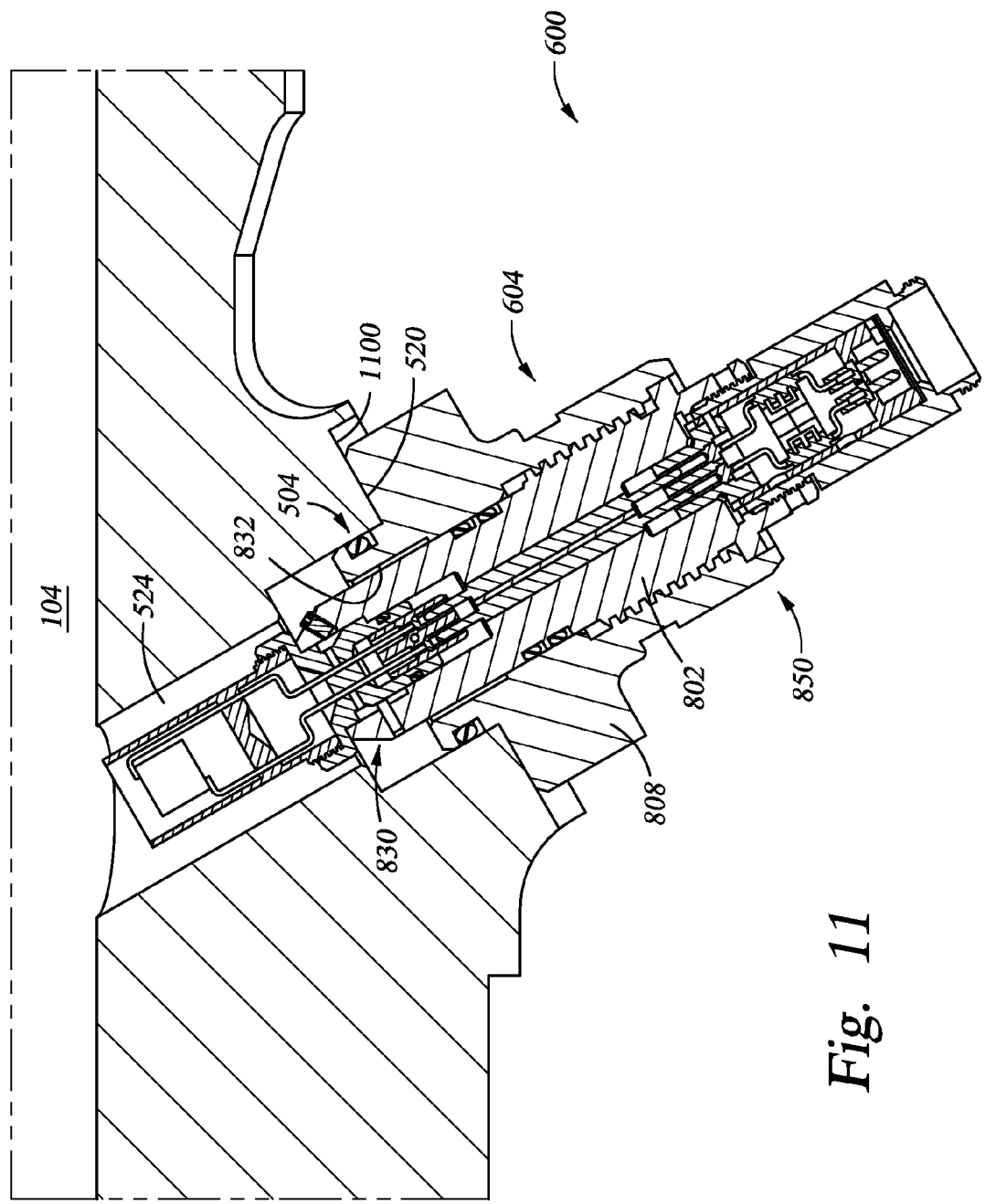
FIG. 11 shows a cross-sectional overhead view of a transducer assembly in a transducer port in accordance with at least some embodiments.

FIG. 11 shows a cross-sectional elevation view of the transducer assembly 600 within a transducer port. Transducer port 504 is illustrative of any of the transducer ports 500, 502, 508 and 512. In particular, the flange portion 808 of the coupling member 604 is mechanically coupled to an exterior surface 1100 of the spool piece 102, an in particular to the flange surface 520. Thus, the proximal or first end 830 of the transition member 802, having the counterbore 832, is disposed within the transducer port 504. Stated otherwise, first end 830 resides within the internal volume defined by the aperture 524 and bounded by the central passage 104 on one end, and the flange surface 520 on the other end. Moreover, the distal or second end 850 of the transition member 802, having the counterbore, resides outside the exterior surface 1100. It follows from the location of the second end 850 that the transformer module 606 likewise resides outside the exterior surface 1100.

By having the transformer module 606 residing outside the exterior surface 1100, the transformer module 606, and the transformer therein, only experiences the temperature swings associate with the ambient environment. Moreover, in such an arrangement the transformer module 608 is not exposed pressure extremes expected inside the central passage 104, and is not exposed to potentially corrosive compounds of the measured fluid. Moreover, the physical dimensions of the transformer module 606 are not constrained by the internal diameter of the aperture 524 of the transducer port 504.

Figure 12:
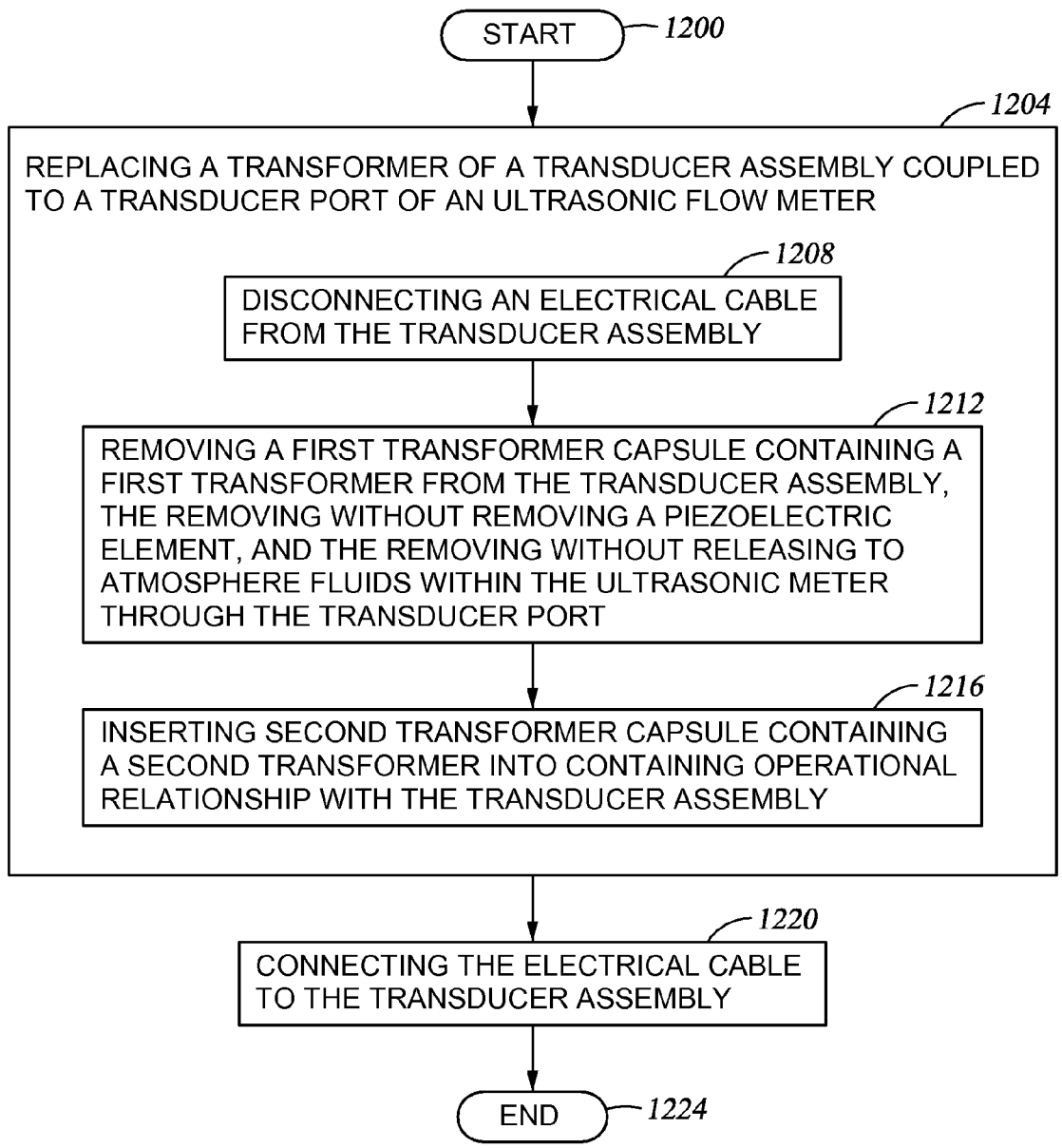
FIG. 12 shows a method in accordance with at least some embodiments.

The design and construction of the transducer assembly leads to a method of replacing a failed transformer that is advantageous in relation to related-art devices. In particular, FIG. 12 shows a method in accordance with at least some embodiments. The method starts (block 1200) and proceeds to replacing a transformer of a transducer assembly coupled to a transducer port of an ultrasonic flow meter (block 1204), the replacing by: disconnecting an electrical cable from the transducer assembly (block 1208); removing a first transformer capsule containing a first transformer from the transducer assembly, the removing without removing a piezoelectric element, and the removing without releasing to atmosphere fluids within the ultrasonic meter through the transducer port (1212); inserting second transformer capsule containing a second transformer into operational relationship with the transducer assembly (block 1216); and then connecting the electrical cable to the transducer assembly (block 1220). Thereafter, the method ends (block 1224).

In embodiments that use a transformer module retaining member, after disconnecting the electrical cable and before removing the first transformer capsule, the transformer module retaining member telescoped over the first transformer capsule is removed. Likewise, after the second transformer capsule is installed, the transformer module retaining member is telescoped over the second transformer capsule and coupled to the coupling member.

The above discussion is meant to be illustrative of the principles and various embodiments of the present invention. Numerous variations and modifications will become apparent to those skilled in the art once the above disclosure is fully appreciated. For example, while in the illustrative embodiments a transformer module retaining member holds the transformer module in place, in other embodiments the transformer module itself may mechanically couple to the coupling member such that no additional retaining member is needed (e.g., the module threads directly to the coupling member). It is intended that the following claims be interpreted to embrace all such variations and modifications.

The invention claimed is:
1. A system comprising:
a spool piece that defines an exterior surface, a central passage, and a transducer port extending from the exterior surface to the central passage;
a transducer assembly coupled to the transducer port, the transducer assembly comprises:
a transition element coupled to the spool piece, the transition element having a first end disposed within the transducer port, and a second end residing outside the exterior surface;
a piezoelectric module with a piezoelectric element, the piezoelectric module directly coupled to the first end of the transition element and the piezoelectric module disposed within the exterior surface;
a transformer module with a transformer disposed therein, the transformer module directly coupled to the second end of the transition element and the transformer module disposed outside the exterior surface; and
an electrical conductor disposed within a passage through the transition element, the electrical conductor couples the transformer to the piezoelectric element.
2. The system of claim 1 further comprising:
a mounting element directly coupled to the spool piece, the mounting element comprising:
a proximal end disposed within the transducer port;
a distal end residing outside the exterior surface;
a throughbore extending from the distal end to the proximal end; and
an outer surface sealed to the spool piece;

wherein the transition element is disposed at least partially within the throughbore of the mounting element, and the transition element is sealed to an internal diameter of the throughbore.

3. The system of claim 2 wherein the transformer module is configured to be removable from the transition element while the mounting element is sealed to the spool piece, and while the transition element is sealed to the mounting element.

4. The system of claim 1 wherein the transducer assembly forms a pressure barrier between the central passage and ambient pressure, and wherein the transformer module is configured to be removable without exposing the central passage to ambient pressure through the transducer port.

5. The system of claim 1 wherein the transducer assembly further comprising a retaining member that defines an internal volume, the retaining member telescoped over the transformer module such that the transformer module resides within the internal volume.

6. The system of claim 1 further comprising:
wherein the piezoelectric module defines a central axis;
wherein the transformer module defines a central axis; and
wherein the piezoelectric module and the transformer module are coaxial.

7. The system of claim 6 further comprising:
wherein the transducer port defines a central axis; and
wherein the piezoelectric module and the transducer port are coaxial.

8. A transducer assembly comprising:
a coupling member comprising:
  a first end that has a first counterbore;
  a second end opposite the first end, the second end has a second counter bore;
  a first electrical pin disposed within the first counterbore;
  a second electrical pin disposed within the second counterbore, the second electrical pin electrically coupled to the first electrical pin; and
  a flange portion disposed between the first end and second end, the flange portion configured to couple the transducer assembly to an exterior surface of a spool piece of an ultrasonic meter, the flange portion defines a plane normal to a central axis of the coupling member;
a piezoelectric module with a piezoelectric element, the piezoelectric module disposed at least partially within the first counterbore, and the piezoelectric module resides wholly on a first side of the plane;
a transformer module with a transformer disposed therein, the transformer module disposed at least partially within the second counterbore, and the transformer module resides wholly on a second side of the plane opposite the first side; and
an electrical conductor disposed within a passage through the coupling member, the electrical conductor couples the transformer to the piezoelectric element.

9. The transducer assembly of claim 8 wherein the coupling member further comprises:
a mounting member that defines a circular bore along the central axis, the flange portion disposed on an outer surface of the mounting member; and
a transition member disposed within the circular bore, the transition member defines the first end, first counterbore, the second end and the second counterbore;
wherein the transition member seals against the internal diameter of the circular bore of the mounting member.

10. The transducer assembly of claim 9 further comprising:
a transformer module retaining member telescoped over the transformer module, the transformer module retaining member comprising:
  a proximal end coupled directly to the second end of the transition member;
  a distal end that has an aperture therethrough, wherein the aperture exposes a third electrical pin coupled to the transformer.

11. The transducer assembly of claim 8 further comprising:
a transformer module retaining member telescoped over the transformer module, the transformer module retaining member comprising:
  a proximal end coupled directly to the coupling member;
  a distal end that has an aperture therethrough, wherein the aperture exposes a third electrical pin coupled to the transformer.

12. A system comprising
a means for containing the flow of a measured fluid;
a transducer assembly comprising:
  a means for coupling the transducer assembly to the means for containing;
  a means for creating acoustic energy, the means for creating coupled to the means for coupling;
  a means for encapsulating a means for impedance matching, the means for encapsulating directly coupled to the means for coupling, and the means for impedance matching electrically coupled to the means for creating;
  the means for coupling designed and constructed such that the means for encapsulating resides outside an exterior surface of the means for containing.

13. The system of claim 12 wherein the means for coupling further comprises:
a means for direct coupling to the means for containing, the means for direct coupling defines a central passage with an internal diameter;
a means for mechanically supporting the means for creating and means for encapsulating, the means for mechanically supporting disposed within and coupled to the internal diameter of the central passage.

14. The system of claim 13 wherein the means for directly coupling further comprises a means for abutting a portion of the exterior surface of the means for containing.

15. The system of claim 13 wherein the means for directly coupling further comprises a means for threadingly engaging the means for containing.

16. The system of claim 12 further comprising a means for retaining the means for encapsulating against the means for coupling.

17. A method comprising:
replacing a transformer of a transducer assembly coupled to a transducer port of an ultrasonic flow meter, the replacing by:
  disconnecting an electrical cable from the transducer assembly;
  removing a first transformer capsule containing a first transformer from the transducer assembly, the removing without removing a piezoelectric element, and the removing without releasing to atmosphere fluids within the ultrasonic meter through the transducer port;
  inserting second transformer capsule containing a second transformer into operational relationship with the transducer assembly; and then
  connecting the electrical cable to the transducer assembly.

18. The method of claim 17 further comprising, after disconnecting the electrical cable and before removing the first transformer capsule, removing a retaining member telescoped over the first transformer capsule.

19. The method of claim 17 further comprising wherein removing the first transformer further comprises translating the first transformer capsule outward from the transducer assembly along a central axis of the transducer assembly to affect both mechanical and electrical decoupling.

20. The method of claim 19 wherein translating further comprises translating outward along the axis without rotating the first transformer capsule about the central axis.

* * * * *